United States Patent [19]

Chelette et al.

[11] Patent Number: 4,591,195
[45] Date of Patent: May 27, 1986

[54] PIPE JOINT

[75] Inventors: K. Darrel Chelette, Katy; Merle E. Evans, Spring, both of Tex.

[73] Assignee: J. B. N. Morris, Harvey, La.

[21] Appl. No.: 517,415

[22] Filed: Jul. 26, 1983

[51] Int. Cl.⁴ .............................................. F16L 15/00
[52] U.S. Cl. .................... 285/332.3; 285/334; 285/350
[58] Field of Search ............... 285/332.3, 334, 350, 285/355

[56]       References Cited
       U.S. PATENT DOCUMENTS

| 2,926,937 | 3/1960 | Parsons | 285/350 |
| 3,100,656 | 8/1963 | MacArthur | 285/355 X |
| 3,185,501 | 5/1965 | Bowan et al. | 285/350 X |
| 3,259,404 | 7/1966 | Papenguth | 285/355 X |
| 4,009,893 | 3/1977 | Schatton et al. | 285/334 X |
| 4,085,951 | 4/1978 | Morris | 285/334 |
| 4,253,687 | 3/1981 | Maples | 285/350 X |

FOREIGN PATENT DOCUMENTS

| 1234162 | 2/1967 | Fed. Rep. of Germany | 285/355 |
| 2457541 | 6/1976 | Fed. Rep. of Germany | 285/332.3 |

Primary Examiner—Thomas F. Callaghan
Attorney, Agent, or Firm—Murray and Whisenhunt

[57] ABSTRACT

An improvement to the sealing ring of U.S. Pat. No. 4,085,951 is disclosed, wherein the sealing ring is of a special design including an in situ sealing flange generating corner, and the stepped thread pin and box members have been modified in the shoulder areas between the thread sections thereof to provide a pressure transmitting area for transmitting torque to the ring, and an undercut area to provide room for formation of the in situ sealing flange which extends beyond the faces of the improved ring.

With the improved design, the sealing ring is capable of retaining hot gases or liquids with a pressure differential across the sealed joint exceeding the yield pressure of the rubber or plastic of which the ring is made, in at least a given direction.

13 Claims, 11 Drawing Figures

PIPE JOINT

BACKGROUND OF THE INVENTION

In oil fields, drill strings are frequently connected by Hydril-type connectors, which involve a two step thread design, as is well known to those in the art. For instance, Hydril-type connectors are disclosed in U.S. Pat. No. 2,532,632, the disclosure of which is hereby incorporated by reference for the teachings of Hydril-type connectors therein.

The prior art has made extensive use of "O" rings and similar sealing means, in the sealing of pipes and the like. See for instance, U.S. Pat. Nos. 3,054,628; 3,167,333; 2,980,451; 2,889,733; 2,813,567; 2,770,477; and 2,553,340. Generally the sealing rings or gaskets of these prior art patents have been made of Teflon or similar plastic material.

The use of rings of plastic or rubber or the like in rotary tools is also known to the art, see, for instance, U.S. Pat. Nos. 2,102,072 and 2,110,127. Finally, the use of Teflon as a sealing ring in Hydril-type connectors is disclosed in U.S. Pat. Nos. 2,907,589 and 3,100,656. In these patents, the Teflon seal ring is located in the area of the free terminal forward end of the pin member of the Hydril-type connector. If such sealing rings are so located on the pin member, they are highly susceptible to damage, and if located on the box member they are quite difficult to install, and subject to a tendency to be locally deranged in an unpredictable manner as the joint is made up.

Many different designs of screw threaded pin and box type tubing and drill pipe joints have been proposed by the prior art. However, in spite of the many proposals, a number of problems have remained unsolved, especially those problems having to do with a method of adequately and enduringly sealing a Hydril-type connector after the metal-to-metal seating surfaces have been damaged, which is a frequent occurrence, against the extremely high fluid pressures which are encountered in deep drilled oil and gas wells. For instance, such pressures might range as high as 15,000 psi.

The rubber O-rings and compressible rubber gaskets, such as those acknowledged hereinabove, have from time to time been used to seal pipe and tubing joints, and under certain operating conditions, especially when relatively low pressures are involved, they have proven to be thoroughly satisfactory. However, such seals have not been suitable for use under the high temperature and pressure conditions which are encountered in deep oil and gas wells. For one thing, these relatively thin rubber rings tend to be badly damaged, and often rendered useless, by being extruded under the well pressure into small clearances between the joint members at the seal ring groove. Compressive ring gaskets, such as of rubber and asbestos, have also been found to be susceptible to damage, probably as a result of a combination of sliding friction and high compressive loads, during make up of the pipe joint with power tools.

Joints used for the purpose of connecting drill pipe lengths or tubing lengths must be made up with a tight fit on tapered lateral contact surfaces in order to provide the required degree of rigidity needed to resist lateral bending stress with a minimum of fatigue. It is, however, difficult to produce sealed joints having both a tight fit on tapered, lateral contact surfaces, and a longitudinally compressed ring gasket, as even very small variations in the machining of the tapered lateral conduct surfaces results in significant displacement variations in the longitudinal make up of the joints, with resultant differences of degree in the amount of compression applied to the ring gasket, which will sometimes be damaged by too great a compression, or may be compressed insufficiently to adequately seal the joint.

Difficulties of this nature have led to the use of special pipe and tubing joints which have tapered sealing elements employing highly polished metal-to-metal fits as a means of sealing against very high oil pressure, and such joints, when made up carefully under ideal conditions, are entirely capable of sealing against such high well pressures. This type of joint, referred to hereinafter as the Hydril-type connector or joint, is generally more costly to manufacture than more conventional pipe and tubing joints, and the polished sealing surfaces or seats are quite susceptible to damage when the joints are made up and broken out under operating conditions encountered in the oil fields. Damage may occur as a result of direct or sliding impact of the pin seal against the end of the box when the lower end of a suspended, relatively heavy pipe stand is stabbed into a joint on the upper end of the pipe which precedes the suspended pipe stand into the well.

Furthermore, the polished metal-to-metal sealing areas or seats are also quite susceptible to damage at the time the joints are screwed together, as even quite small particles of dirt or sand, if trapped between the mating seats, are capable of scoring or producing galling which may completely destroy the effectiveness of the metal-to-metal seal. Excessive friction, caused by overtightening, lack of lubrication, or rapid make up, will occasionally cause the tight fitting metal-to-metal seats to gall during the last fraction of a turn as the joints are screwed together.

In an effort to avoid the entrapment of dirt and sand particles between the seating surfaces as the joints are screwed together, the prior art has customarily made the metal-to-metal contact area between the seats relatively narrow. The prior art may provide one joint member with an arcuate seating surface and the mating member with a conical seating surface to obtain a line of contact between the two surface. However, such narrow seating surfaces are not generally desirable because they are quite vulnerable to attack by the corrosive fluids which are often present in oil and gas wells. In this regard, the corrosive fluids need penetrate only a relatively short distance in order to completely destroy the line of metal-to-metal contact existing between the two joint surfaces, and thereby destroy the seal.

Thread damage is frequently caused by the vertical stabbing of threaded pin ends of suspended heavy pipe stands into threaded box ends of pipe or pipe collars supported beneath the pipe stands. This damage usually occus when the entire stabbing load falls on the relatively thin and frail thread ends of the threaded pin and box members. A damage end thread on one joint member will often damage, and occasionally destroy, a number of additional threads on both members should the pin and box be screwed together before the thread end damage is discovered.

The Hydril-type connectors, because of their relatively delicate sealing areas, are easily damaged. Damage to the Hydril-type connector sealing areas has heretofore required that the unit be scrapped, or shop repaired at great expense.

The Hydril Company commercially offers a patented tubing connection, with a Teflon ring located in the box member at a location such that when the connection is made up the ring will be at the free terminal end of the pin. It is indicated that the prime purpose of this ring is to complete the corrosion protection afforded by plastic coated pipe. The advertising material also indicates that the connection may be specified where an additional high-pressure seal is desired.

The Rucker Atlas Bradford Company has offered leak-proof tubing to the trade, using conventional thread profile, but modifying the coupling by machining out one and one-half threads near each end of the internally threaded coupling and installing a Teflon ring in the resultant retaining groups. In another version, a pin and box member design is provided wherein a groove is machined inside the box member to retain a Teflon seal ring.

U.S. Pat. No. 4,085,951 to James B. N. Morris, issued Apr. 25, 1978, discloses the use of a secondary sealing means between the stepped threaded areas of a Hydril-type casing connector or joint. The secondary seal is an annular ring of relatively rigid internally tenacious plastic or rubber material, such as polytetrafluoroethylene, which serves to contain well pressure if the metal-to-metal sealing surfaces on the pin and/or box members of the Hydril-type connector are damaged. With the sealing rings disclosed in the Morris patent, damaged Hydril-type connectors can be used without having to undergo extensive repair of the damaged area, or even scrapping.

FIGS. 5, 6, 7 and 8 of the Morris patent disclose various forms of sealing rings which can be used therein, with various modifications of the inner wall of the annular ring being made to facilitate installation of the ring over a portion of the threads of the Hydril-type connector. Column 5, lines 3–9 of the Morris patent also suggest that a ring of square cross-sectional area, as illustrated in FIG. 8, may be installed by heating the ring until the ring expands enough to permit it to be slipped over the pin member threads, or alternatively suggest the ring could be actually molded in place in the ring-receiving groove.

The sealing ring of the Morris patent has been found to work very effectively, especially when used to contain liquids. However, the sealing ability of the sealing ring of the Morris patent is pressure limited by the contact pressures which can be applied to the ring, and it has been found that high pressure gases can leak relatively easily past the relatively small sealing area of the sealing ring of the Morris patent.

SUMMARY OF THE INVENTION

The present invention is directed to an improvement in the Morris U.S. Pat. No. 4,085,951, wherein the pin and box members of the Hydril-type joint are modified, and wherein the annularly continuous ring of relatively rigid, internally tenacious plastic or rubber material is of a special design, whereby an in situ sealing flange is formed on the sides of said ring upon exposing the ring to joint assembly pressure. Thus the present invention relates to improvements in threaded-type joints, and in particular relates to the design and construction of sealed, screw threaded oil well tubing and casing joints which are capable of being rapidly made up to positive pressure seal condition, and rapidly broken apart without damage to the seals or threads during either make up or breaking of the joint under conditions of repeated severe usage in the field. The present invention is directed to improvements in Hydril-type connectors wherein the connector is capable of maintaining a pressure differential in at least one direction across the annular ring which is in excess of the yield pressure of the material of which the annular ring is made. The present invention is applicable to inserted joints, wherein one pipe end is screwed directly into the end of another pipe end, to couplings in which the opposed ends of two pipes are threaded into a tubular collar, and into other similar types of pipe end connections.

A ring receiving groove is located at the shoulder between the stepped threads of a Hydril-type connector, and preferably on the pin member of the Hydril-type connector. The ring receiving groove is radially located at least about as far from the pipe axis as the thread roots, and includes a pressure transmitting area for transmitting make up torque to the face of the annular ring located in the groove. An undercut is provided in the shoulder area adjacent the groove to provide room for formation of the in situ sealing flange which extends beyond the face of the annular ring. A generally flat chamfer joins the undercut to the pressure transmitting area, and extends at an angle of about 15° to 75°, preferably about 45°, to the axis of the pipes. The other shoulder, preferably on the box member, also has a chamfer which is at an angle of about 15° to 75°, preferably about 45°, to the axis of the pipes. The take off points of the chamfers is at least substantially the same distance from the axis of the pipes, thereby permitting the ring room to expand on either side thereof to form said in situ sealing flange. The preferred annular ring which is used in the present invention has corners located on the sides thereof and between the inner and outer surfaces thereof in order to assist in the generation of the in situ sealing flange. A stiffening lower portion of the ring is provided to support and stabilize the ring in the ring receiving groove upon make up of the Hydril-type joint. When the ring and groove are on the pin member, it is preferred that the radially outermost portion of the ring include face areas for receiving pressure from the pin and box members upon make up of the joint, to transmit pressure to the corners mentioned above to cause the in situ sealing flange to form.

DETAILED DESCRIPTION OF THE INVENTION

The invention will be more readily understood with reference to the accompanying drawings, wherein FIG. 1 is a cross-sectional view of a typical joint of the present invention;

Figure 1:
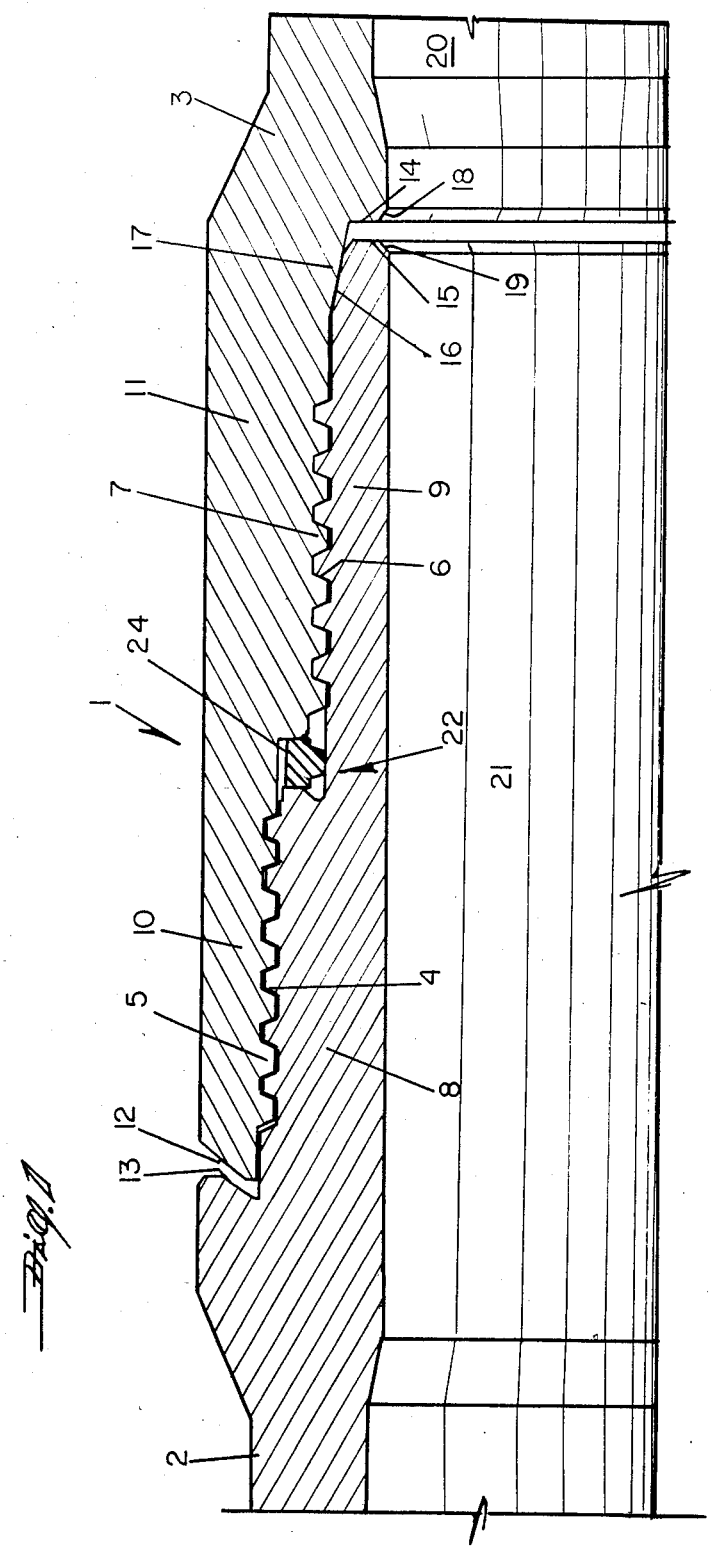

In FIGS. 1, 2, 3, 4, 5 and 6, a joint 1 includes a pin member 2 and a box member 3 having interengaged two step threads, with threads 4 and 5 interengaged in one step and threads 6 and 7 interengaged in a second step. The pin and box members are of the two-step type, with pin threads 4 and 6 cut on steps 8 and 9 respectively, and being of the same pitch and outline characteristics. In a similar manner, box member threads 5 and 7 are complimentary to pin threads 4 and 6 and are cut on steps 10 and 11, respectively. At the outer end of the box there is provided a tapered box stop shoulder 12 which is complimentary to a opposed pin stop shoulder 13, while at the inner end of the box there is a square cut shoulder 14 and a complimentary square cut pin shoulder 15. When the joint 1 is fully made up, tapered pin and box stop shoulders 16 and 17 are in compressive engagement near the forward end of the pin.

The box and pin members have rather shallow bevels or chamfers 18 and 19 intersecting the box and pin bores 20 and 21 and also intersecting the box shoulder 14 and the pin shoulder 15, respectively. The chamfers are generally coaxial and typically will extend at around 20° angularity with the bores 20 and 21 as illustrated.

The mating shoulders provide metal-to-metal seating surfaces, serving to seal the joint against outward escape of high fluid pressure from the joint. However, upon damage of one or more of the shoulders, the joint may no longer be capable of retaining full well pressure. The present invention is directed to providing a Hydril-type connector or joint having a secondary sealing means which will contain full well pressure in the pipe, even though the mating metal-to-metal shoulders are damaged.

To provide this secondary sealing means, which seals the interior of the pipe against the fluid pressure therein, in the pin shoulder area 22 between steps 8 and 9 of the pin member 2 an undercut groove 23 is provided. An annular ring 24 of relatively rigid internally tenacious plastic or rubber material, such as, for instance, of Teflon (polytetrafluoroethylene) is provided in the groove. It is preferred that the ring include a filler to increase the strength thereof, and suitable inorganic fillers include glass fibers, fine particle size ceramic materials, and fine particle size metals. The ring may be pigmented if desired.

Figure 2:
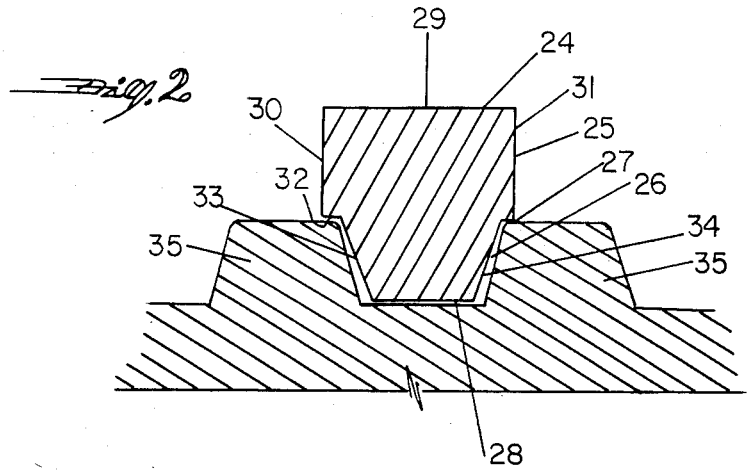
FIG. 2 is a cross-sectional view of a sealing ring being threaded on a pin member of a Hydril-type joint.

As more clearly illustrated in FIG. 2, the unstressed ring includes an upper portion 25 and a lower portion 26. Corner 27 is located in the area between upper portion 25 and lower portion 26. The ring 24 includes an inner surface 28, an outer surface 29, substantially vertical sidewalls 30, 31, and flats 32 extending between corners 27 and lower portion 26. Lower portion 26 includes beveled walls 33, 34, so that lower portion 26 is in the form of a trapezoid. As illustrated in FIG. 2, the shape of lower portion 26 is such as to fit between threads 35 of pin member 2. As will be seen most clearly in FIG. 6, a gap 36 of at least 15° and generally no more than 45°, and preferably about 30°, is formed in lower portion 26, so that ring 24 will be readily threadable over threads 35.

Figure 3:
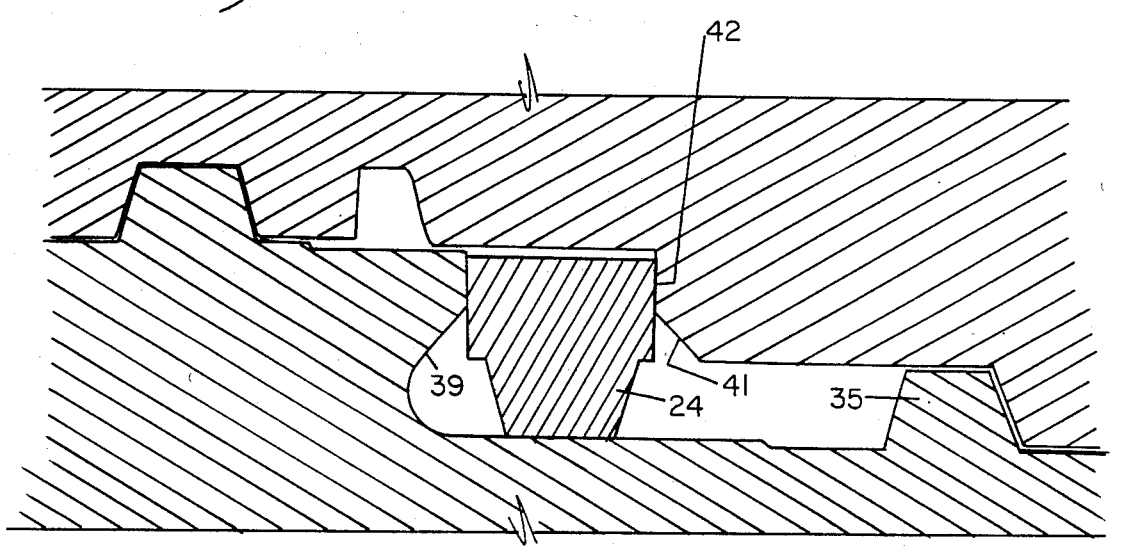
FIG. 3 is a cross-sectional view of a portion of the joint of FIG. 1, showing greater detail.
Figure 5:
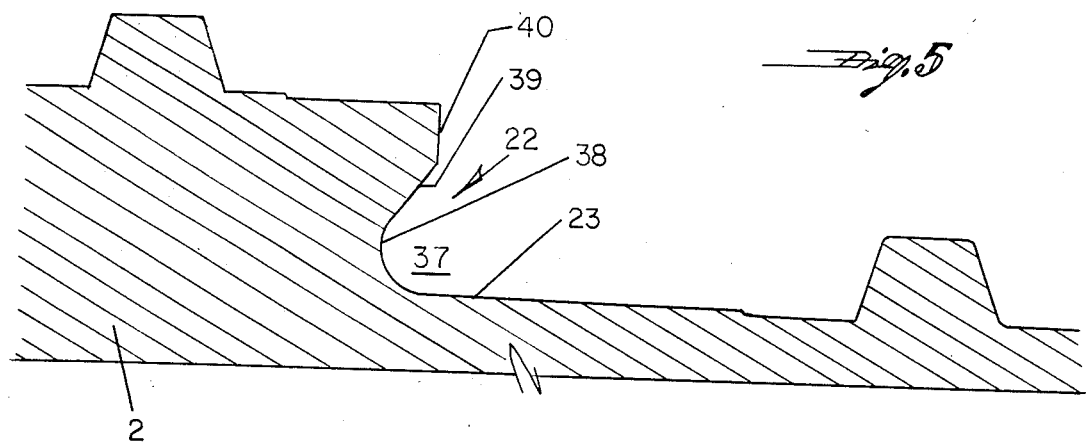
FIG. 5 is a cross-sectional view of the pin member of the joint of FIG. 3.
Figure 6:
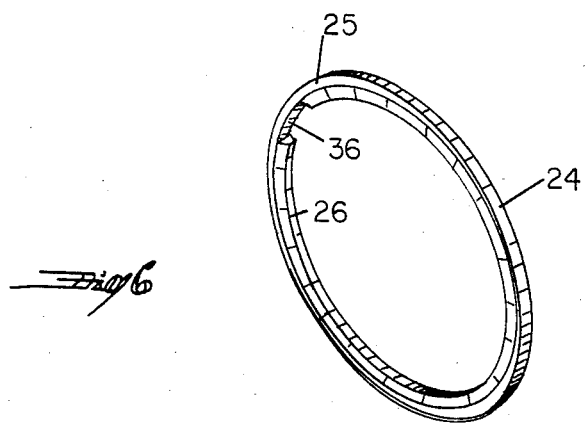
FIG. 6 is a perspective view of the sealing ring illustrated in FIGS. 1–5.

The modifications to a conventional Hydril-type connector can be noted most readily with respect to FIGS. 3 and 5 of the drawings. An undercut area 37 is formed in the region pin shoulder area 22. The innermost portion 38 of undercut 37 is radiused in order to prevent stress concentration, and preferably the radius of innermost portion 38 is at least 0.01 inches. A chamfer 39 joins innermost portion 38 to pressure transmitting face 40, which upon joint make up transfers make up torque to ring 24 in combination with a corresponding face on box member 3. A chamfer 41 on box member 3 corresponds in take-off point and angle to chamfer 39, and is associated with pressure transmitting face 42 on box member 3 which as indicated cooperates with pressure transmitting face 40 on pin member 2. Except for chamfer 41, the box member is of generally conventional Hydril-type box member design.

Figure 4:
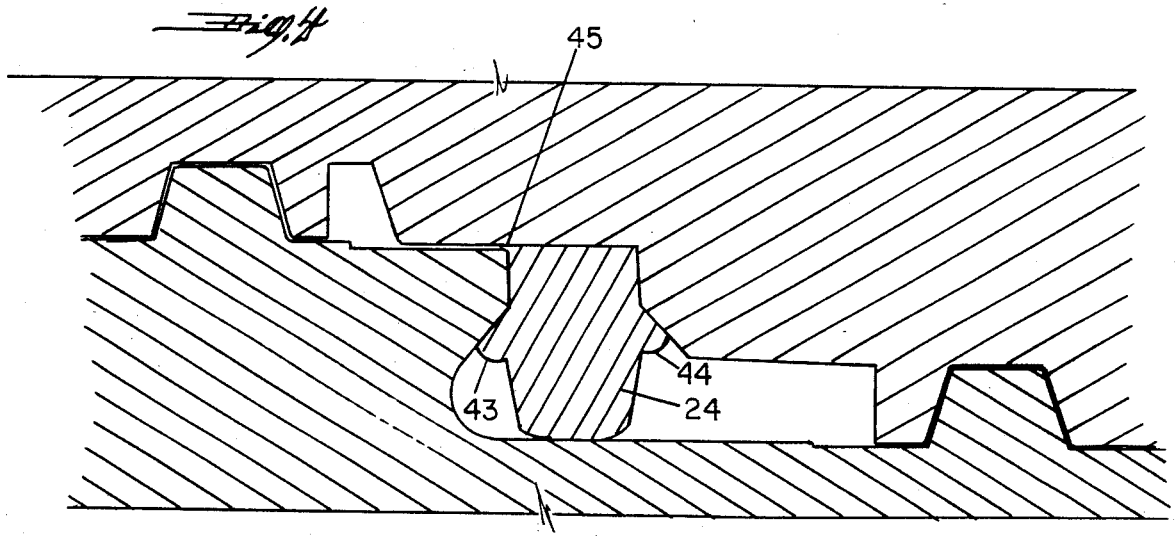
FIG. 4 is a cross-sectional view of the joint of FIG. 3 showing the formation of the in situ sealing flanges on the annular ring upon joint make up.

The lower portion 26 of ring 24 serves as a stiffening and support for the upper portion 25, which receives pressure from the pressure transmitting faces and functions to seal the joint against high pressure fluids by forming an in situ sealing flange at corner 27. This is more clearly noted with reference to FIGS. 3 and 4, wherein FIG. 3 is an expanded cross-sectional view of the joint of FIG. 1, with a joint made up to a point wherein the pressure transmitting faces are just beginning to engage the sidewalls 30, 31 of ring 24. After the joint has been made up, the ring 24 is placed under compression between pressure transmitting faces 40, 42, as illustrated in FIG. 4, with the resulting formation of sealing flanges 43, 44 in the region of corners 27. The make up torque may cause some minor flow of the material of the sealing ring to form a skirt 45 in the gap between pin member 2 and box member 3 above and behind pressure transmitting face 40. With the formation of sealing flanges 43, 44 in the embodiment of FIG. 4, the resulting joint can withstand high pressures exerted from the inside of the pipe to the outside of the pipe, with the pressure differential across the pipe walls exceeding the yield pressure of the material of which the ring is made, especially when the ring contains inorganic filler material. Preferably the amount of filler utilized is between 15 and 45%, suitably about 30%, by weight. It is preferred that a substantial proportion more preferably the majority, of the filler be glass fibers in view of their excellent strength reinforcement characteristics, but the glass fibers can be in part or even fully replaced by other inorganic fillers such as ceramic or metal filler. Organic fillers are not preferred because of cost and generally poorer strength characteristics, but can be utilized if desired if capable of withstanding the processing and use temperatures to which such organic fillers may be exposed.

With the use of a suitable filled polytetrafluoroethylene ring, or other suitable ring, an increase of the pressure differential across the pipe wall, from the inside to the outside of the pipe, increases the sealing ability of ring 24 of FIG. 4. The increased pressure acts upon sealing flanges 43, 44 to cause the flanges to be pressed into even tighter sealing engagement with chamfers 39, 41, respectively to thereby increase the sealing ability of ring 24. This permits the joint of the present invention to be utilized in situation wherein conventional joints are highly likely to fail, and especially for the sealing of high pressure gases in hot corrosive conditions.

The axial width of the lower portion 26 of ring 24 should be at least 40% of the axial width of the upper portion 25 in order to provide adequate stiffening and reinforcing of the upper portion.

Chamfers 39, 41 are substantially at the same angle to the axis of the pipes and preferably at identical angles, with the angles varying from about 15° to 75°, preferably about 30° to 60°, and most preferably about 45°. The take off points of the chamfers 39, 41 are at least substantially the same distance from the axis of the pipes, and preferably are of identical distances from the axis of the pipes, and are no further from the axis of the pipes than the radial mid-point of the upper portion 25. The width of the chamfer 39 is at least equal to the width of chamfer 41. The concave radius of innermost portion 38 is not less than 0.01 inches, preferably not less than 0.015 inches.

While the present description is with respect to a sealing ring 24 installed on a pin member 2, it will be readily appreciated that the ring may be installed on the box member of a pin and box Hydril-type connector. However, due to the difficulty of ring installation and inspection, it is greatly preferred to have the ring located on the pin member.

It is preferred that the ring be made of a filled polytetrafluoroethylene which has a compressive strength of at least 1500 psi, and more preferably of at least 2,000 psi.

The corners 27 of ring 24 are preferably right angle corners, but it will be readily appreciated that angles greater or less than 90° may be utilized if desired. The corner should have a dimension of at least 0.01 inches per side, and preferably at least 0.02 inches per side.

Figures 7, 8:
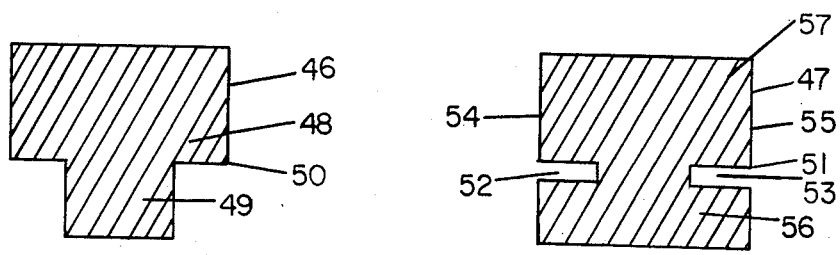
FIG. 7 is a cross-sectional view of a different embodiment of the sealing ring.
FIG. 8 is a cross-sectional view of a yet further embodiment of the sealing ring.

Other forms of sealing rings may be utilized in the joint of the present invention without departing from the scope of this invention. For instance, a sealing ring 46 as illustrated in FIG. 7 may be utilized, or alternatively a sealing ring 47 as illustrated in FIG. 8 may be utilized. Sealing ring 46 includes an upper portion 48 and a lower portion 49, with lower portion 49 being rectangular or square in cross-section, as opposed to the trapezoidal shape of the lower portion 26 of ring 24 of FIG. 2. Corners 50 of ring 46 will perform the same functions as corners 27 of ring 24, so that the in situ sealing flanges will be formed in a joint utilizing ring 46. Likewise, corners 51 on ring 47 will form an in situ sealing flange, with corners 51 being defined by grooves 52, 53 cut into sidewalls 54, 55 respectively of ring 47. In this embodiment, the major part of lower portion 56 of ring 47 is of the same axial width as upper portion 57.

Figure 9:
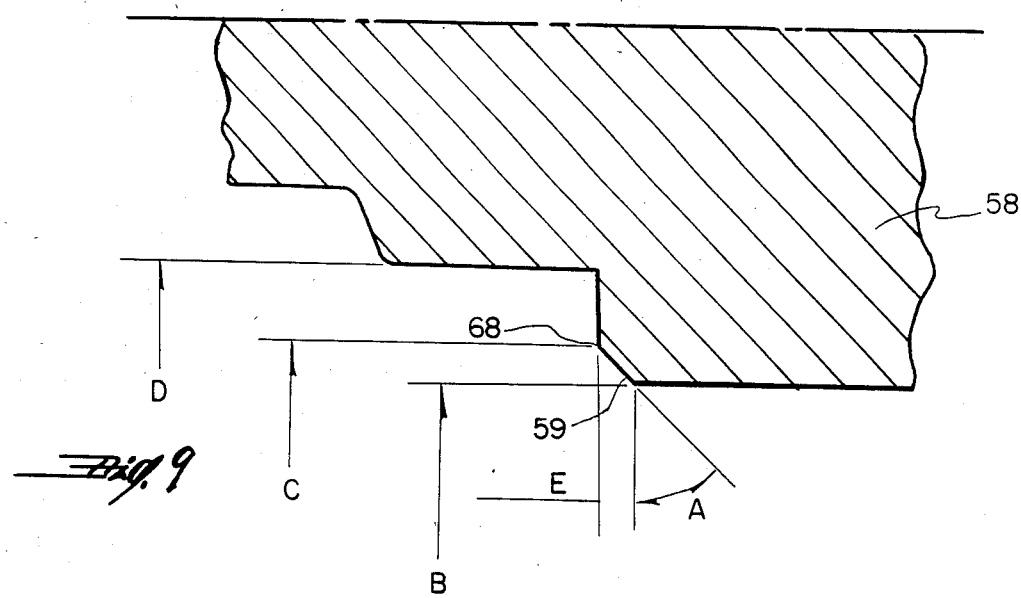
FIG. 9 is a cross-sectional view of a portion of the box member of FIG. 3.

In the preferred embodiment of the present invention, the box member 58 of FIG. 9 will have a chamfer 59 having an angle A to the axis of the pipe of 45° ±5°. The pipe has a bore diameter B of 2.231 inches, and the take off point 60 of chamfer 59 has a diameter of 2.279±0.002 inches. The innermost threads have a minor diameter D of 2.379 inches. Chamfer 59 has an axial width E of 0.024 inches.

Figure 10:
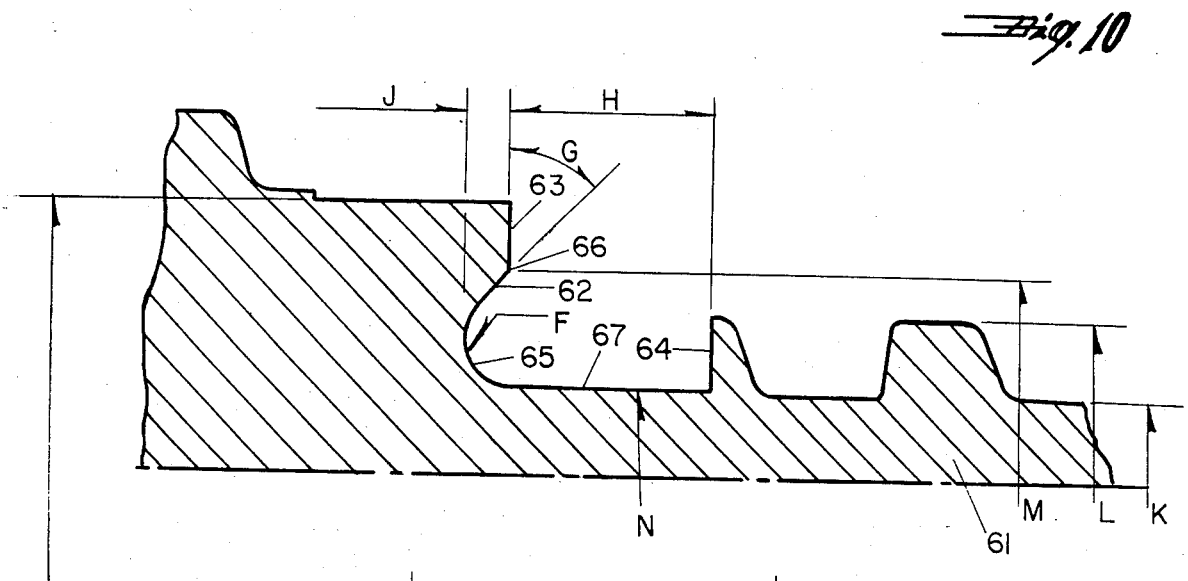
FIG. 10 is a cross-sectional view of a portion of the pin member of the joint of FIG. 3, taken at a different point around the pin circumference than the view of FIG. 5.

The pin member 61 of FIG. 10 is designed to be used with box member 58 of FIG. 9, and includes an undercut radius F of 0.032±0.005 inches. Chamfer 62 is at an angle G of 45°±5°. The distance H between pressure transmitting face 63 and first thread 64 is 0.135±0.005 inches. The depth J of undercut 65 is 0.037 inches. The pin member has threads having a minor diameter K of 2.115 inches and a major diameter L of 2.215 inches. The chamfer corner 66 has a diameter M of 2.279±0.002 inches. The ring receiving groove 67 has a diameter end of 2.122+0.000, −0.004 inches.

Figure 11:
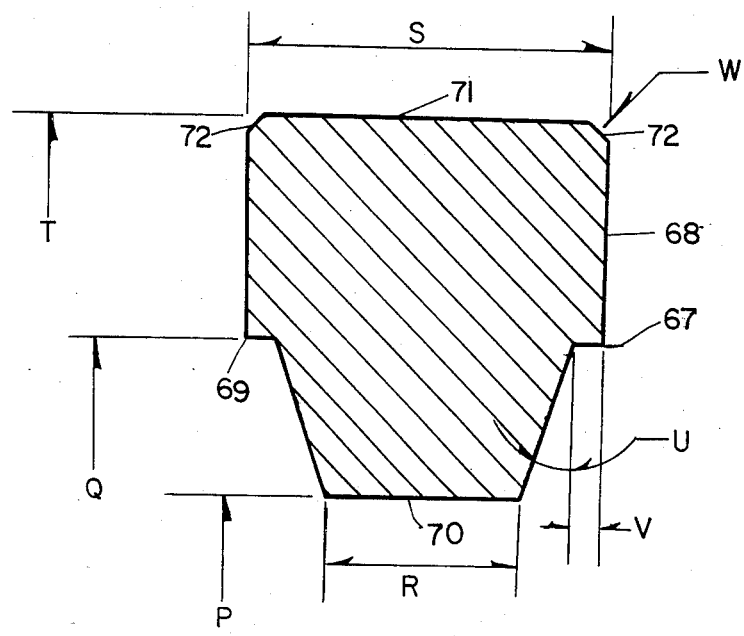
FIG. 11 is a cross-sectional view of the preferred sealing ring of the present invention.

The ring 68 of FIG. 11 is intended to be used with the box and pin members of FIGS. 9 and 10, respectively. The ring has an inside diameter P of 2.118+0.000, −0.002 inches with corners 69 located at a diameter Q of 2.215+0.004, −0.000 inches. The inner surface 70 of the ring has a width R of 0.065 inches, whereas the outer surface 71 of the ring has a width S of 0.120±0.002 inches. The outer surface of the ring has a diameter T of 2.358±0.002 inches. The trapezoidal lower portion of ring 68 includes an angle U of 20°±1°. The corners 69 have a lower width V of 0.010+0.004, −0.000 inches. Chamfers 72 have a width W of 0.005±0.002 and are at an angle of 45°±5°.

While the present invention has been described in relationship to pin and box members, it is to be understood that the present invention can be utilized in pipe connections using pipe having stepped male threads on each end thereof, and a coupling having stepped female threads in each end thereof, as the mechanical equivalent of the described pin and box member connection.

It is claimed:

1. A joint for coaxially interconnecting a pair of pipes, said joint comprising coaxial pin and box members respectively including interengaged external and internal first threads, and interengaged external and internal second threads, said first threads on said pin member being adjacent the free terminal forward end of said pin member and being of smaller outer diameter than said second threads, said threads holding the pipes against separation, said first threads and said second threads having substantially the same pitch and outline characteristics, said pin member being screwed about its axis longitudinally forwardly into said box member, metal-to-metal seating surfaces on said pin and box members, said surfaces in interengagement when undamaged, an annular pin member shoulder providing a stepped portion on said pin member between said first threads and said second threads, an annular box member shoulder providing a stepped portion on said box member between said first threads and said second threads, said threads having lands and roots, one of said shoulders being contiguous with a ring receiving means for receiving an annular ring, an annularly continuous ring of relatively rigid, internally tenacious plastic or rubber material received in said ring receiving means, said ring having radially outer and inner portions, an in situ sealing flange generating corner means located between said outer and inner portions for forming an in situ sealing flange on each side of said ring upon exposure to assembly pressure, said in situ sealing flange being pressure energizable by a pressure differential thereacross to provide sealing of said joint in a given direction even when the pressure differential in that direction exceeds the yield pressure of the said plastic or rubber material, one of said portions including stiffening means for supporting and stabilizing said ring in said ring receiving means upon make up of said joint, the axial width of said stiffening means being at least 40% of the axial width of the other portion, said other portion including face means for receiving pressure from said pin and box members upon make up of said joint and transmitting pressure to said corner means to cause said in situ sealing flange to form, said ring receiving means being radially located at least about as far from the pipe axis as the pin first thread roots and including a pressure transmitting area for transmitting make up torque to said face means, and an undercut means for providing room for formation of said in situ sealing flange extending beyond said face means, a generally flat first chamfer joining said undercut to said pressure transmitting area and extending at an angle of about 15 to 75 degrees to the axis of said pipes, the shoulder other than the shoulder contiguous with said ring receiving means having a second chamfer for contacting and transmitting pressure to said face means, said second chamfer at an angle of about from 15 degrees to 75 degrees to the axis of said pipes, the take off points of said chamfers being at least substantially the same distance from the axis of said pipes and being no further from said axis than the radial mid-point of said other portion, the width of the first chamfer being at least equal to the width of said second chamfer, said undercut means having a concave radius of not less than 0.010 inches.

2. Joint of claim 1, further including gap means in the one of said portions in contact with the member having said ring receiving means for defining a gap for passage of a thread land to permit said ring to fit relatively tightly with respect to the first thread roots of said member but threadable thereon.

3. Joint of claim 1 wherein said ring receiving means is on said pin member.

4. Joint of claim 3, wherein said ring is of filled polytetrafluoroethylene.

5. Joint of claim 4, wherein said filled polytetrafluoroethylene has a compressive strength of at least 1500 psi.

6. Joint of claim 1 wherein said chamfers extend at an angle of about 30 to 60 degrees to the axis of said pipes.

7. Joint of claim 6 wherein said angle is about 45°.

8. A length of oil field pipe interconnectable with similar lengths of pipe, said pipe including coaxial pin and box members on opposite ends of the pipe, said pin member including external first and second threads with the first threads on said pin member being adjacent to the free terminal forward end of said pin member and being of smaller outer diameter than said second threads, said box member including internal first and second threads which are interengageable with the pin member of a similar length of pipe, with said threads holding the pipes against separation, an annular pin member shoulder providing a stepped portion on said pin member between said first threads and said second threads, an annular box member shoulder providing a stepped portion on said box member between said first threads and said second threads, one of said shoulders being contiguous with a ring receiving means for receiving an annular ring, an annularly continuous ring of relatively rigid, internal tenacious plastic or rubber material located in said ring receiving means, said ring having radially outer and inner portions, an in situ sealing flange generating corner means located between said inner and outer portions for forming an in situ sealing flange on each side of said ring upon exposure to assembly pressure, with said in situ sealing flange being pressure energizeable by a pressure differential there across to provide sealing of said joint in a given direction even when the pressure differential in that direction exceeds the yield pressure of said plastic or rubber material, one of said portions including stiffening means for supporting and stabilizing same ring in said ring receiving means upon make up of said joint, the other portion including face means for receiving pressure from said pin and box members upon make up of said joint and transmitting pressure to said corner means to cause said in situ sealing flange to form, and an undercut means adjacent one of said shoulders for providing room for formation of said in situ sealing flange extending beyond said face means.

9. A joint for coaxially interconnecting a pair of pipes, said joint comprising coaxial pin and box members respectively including interengaged external and internal first threads, and interengaged external and internal second threads, said first threads on said pin member being adjacent the free terminal forward end of said pin member and being of smaller outer diameter than said second threads, said threads holding the pipes against separation, said first threads and said second threads having substantially the same pitch and outline characteristics, said pin member being screwed about its axis longitudinally forwardly into said box member, metal-to-metal seating surfaces on said pin and box members, said surfaces in interengagement when undamaged, an annular pin member shoulder providing a stepped portion on said pin member between said first threads and said second threads, an annular box member shoulder providing a stepped portion on said box member between said first threads and said second threads, said threads having lands and roots, said pin member shoulder being contiguous with a ring receiving means for receiving an annularly continuous ring of filled polytetrafluoroethylene received in said ring receiving means, said ring having radially outer and inner portions, an in situ sealing flange generating corner means located on said ring between said outer and inner portions for forming an in situ sealing flange on each side of said ring upon exposure to assembly pressure, said in situ sealing flange being pressure energizeable by a pressure differential there across to provide sealing of said joint in a given direction even when the pressure differential in that direction exceeds the yield pressure of the polytetrafluoroethylene, the axially innermost portion including stiffening means for supporting and stabilizing said ring in said ring receiving means upon make up of said joint, the axial width of said stiffening means being at least 40% of the axial width of the radially outermost portion, said radially outermost portion including face means for receiving pressure from said pin and box members upon make up of said joint and transmitting pressure to said corner means to cause said in situ sealing flange to form, said ring receiving means being radially located at least about as far from the pipe axis as the pin first thread roots and including a pressure transmitting area for transmitting make up torque to said face means, undercut means on said pin member for providing room for formation of said in situ sealing flange extending beyond said face means, a generally flat first chamfer joining said undercut to said pressure transmitting area and extending at an angle of about 45° to the axis of said pipes, the box member shoulder having a second chamfer at an angle of about 45° to the axis of said pipes, the take-off points of said chamfers being at least substantially the same distance from the axis of the said pipes and being no further from said axis than the radial mid-point of the radially outermost portion of said ring, the width of said first chamfer being at least equal to the width of said second chamfer, said undercut means having a concave radius of not less than 0.01 inches, and gap means in the radially innermost portion of said ring for defining a gap for passage of a thread land to permit said ring to fit relatively tightly to the first thread roots of said pin member but being threadable thereupon.

10. Joint of claim 9 wherein the inner portion of said ring is in the shape of a trapezoid.

11. Joint of claim 9, wherein said corner means are substantially right angle corners.

12. Joint of claim 11, wherein said corner means provides a corner of at least 0.010 inches per side.

13. Joint of claim 12 wherein the radial width of said inner portion is greater than the minimum width required to support and stabilize said ring in said ring receiving means.

* * * * *